United States Patent [19]

Chen et al.

[11] Patent Number: 5,419,923
[45] Date of Patent: May 30, 1995

[54] FABRICATION METHOD FOR TRACING PAPER

[75] Inventors: Jeremiah Chen; C. C. Chang, both of Taoyang County, Taiwan, Prov. of China

[73] Assignee: Shinkong Synthetic Fiber Corp., Taipei, Taiwan, Prov. of China

[21] Appl. No.: 197,172

[22] Filed: Feb. 16, 1994

[30] Foreign Application Priority Data

Feb. 17, 1993 [CN] China .............................. 93 1 01952.4

[51] Int. Cl.⁶ ................................................ B05B 5/00
[52] U.S. Cl. .................................... 427/161; 427/393.5; 524/474; 524/570; 524/650; 524/871; 524/876
[58] Field of Search .................... 427/161, 391, 393.5; 524/474, 570, 650, 871, 876

[56] References Cited

U.S. PATENT DOCUMENTS

| | | | |
|---|---|---|---|
| 3,528,493 | 5/1971 | Smith | 427/391 X |
| 4,010,307 | 3/1977 | Canard et al. | 427/391 X |
| 4,137,046 | 1/1979 | Koike et al. | 427/161 X |
| 4,374,158 | 2/1983 | Taniguchi et al. | 427/578 X |
| 4,923,848 | 5/1990 | Akeda et al. | 427/331 X |

Primary Examiner—Michael Lusignan
Attorney, Agent, or Firm—Beveridge, DeGrandi, Weilacher & Young

[57] ABSTRACT

A method for manufacturing tracing paper, comprising coating a plastic film with a coating material. The coating material comprises a solvent system, adhesives, writable inorganic pigments and surfactants. The solvent system contains 50-80% by weight of aliphatic solvent and 20-50% by weight of aromatic solvent. The coating material includes 20-60% by weight of solid components. The inorganic pigments are in an amount of 30-60% based on the weight of the solid components of the coating material.

20 Claims, No Drawings

FABRICATION METHOD FOR TRACING PAPER

BACKGROUND OF THE INVENTION

The present invention relates to a method for manufacturing tracing paper, and more particularly to a method for manufacturing engineering-used or art-used tracing paper, wherein a plastic film is coated with a layer of writable semitransparent coating material.

A conventional tracing paper is mostly manufactured by means of applying sandblasting and coating to a transparent substratum. While the cost of coating is relatively high, a tracing paper with better quality can be obtained by way of coating. Therefore, the current commercially available tracing paper is mostly made in coating manner.

SUMMARY OF THE INVENTION

According to the present invention, the employed substratum for the tracing paper is a plastic film and the coating material is made from specific prescription in specific procedure. The coating material includes a solvent system serving as a carrier. The solvent system is liquid at room temperature, including solvents and nonsolvents. In case a thermoplastic resin is used as an adhesive, the same must be soluble in the solvent system. Surfactants and nonsolvents have the aid in wetting inorganic pigment to lower the surface activation thereof and facilitate the dispersion thereof in the coating material.

The butanone and cyclohexanone are satisfactory solvents for the adhesives in the present invention. However, the physical properties of these two solvents are quite different. The viscosity of butanone is 0.497 cps at room temperature, while the viscosity of cyclohexanone is 2.30 cps at 17.3° C. and is 20.3 cps at 39.1° C. The viscosity of cyclohexanone varies largely within a specific temperature range. The boiling point of butanone is 79.6° C. and the volatilizing speed thereof is 465. (The relative volatilizing speed of ethyl acetate is 100.) The boiling point of cyclohexanone is 156.7° C. and the volatilizing speed thereof is 25. The boiling point of toluene is 111.0° C. and the volatilizing speed thereof is 195. Therefore, the solvents for the coating material must be selected in consideration of not only the solvency but also volatility of the solvents. This is because the volatilizing speed of solvents will affect the dryness and paintability of the coating material. Moreover, the volatilizing speeds of high purity toluene and industry-used toluene are almost the same. In view of only dilution, the industry-used toluene is considered a satisfactory material.

The coating material contains 20–60% by weight of solid. If less than 20% by weight, the coating may be too thin. If greater than 60% by weight, the viscosity of the coating may be too high or the coating device may fail to have sufficient re-writability for easy coating operation. The solid includes 30–60% by weight of an inorganic pigment. If less than 30% by weight, the writability of the coating will be poor. If greater than 60% by weight, it will be not easy to adhere the coating to the plastic film and the powder dropping phenomenon is liable to occur. In a preferred embodiment of the present invention, the solubility parameter of the used adhesive is close to that of aliphatic solvent. Therefore, the aliphatic solvent can be in an amount of 50–80% by weight. Less than 50% by weight, it will be not easy to solve the adhesive and the coating will be unstable and thus the adhesive is liable to precipitate. The aromatic solvent can be in an amount of 20–50% by weight. If less than 20% by weight, the inorganic pigment is not easy to be wetted. If greater than 50% by weight, the results will be just the same as that in the condition that the aliphatic solvent is in an amount of less than 50% by weight. The solid content includes 40–70% by weight of adhesive. If less than 40% by weight, the coating is likely to strip after drying. If greater than 70% by weight, the writability of the coating becomes poor and the cost is increased. In the used adhesives, the solution of vinyl chloride/vinyl acetate copolymers and phenoxy resins is more able to wet the inorganic pigment and is able to suitably increase the surface hardness of the coating. On the other hand, the polyurethane is used mainly for providing strongest adhering force. The vinyl chloride/vinyl acetate copolymers are in an amount of 10–50% by weight. Less than 10% by weight will cause poor dispersion of the coating material. If greater than 50% by weight, the coating will be apt to strip. The phenoxy resins are in an amount of 5–25% by weight. If less than 5% by weight, the hardness of the coating in decreased. If greater than 25% by weight, the viscosity of the coating material will be too high and thus the coating procedure will be not easy. The polyurethanes are in an amount of 40–80% by weight. If less than 40% by weight, it is not easy to firmly form the coating. If greater than 80% by weight, the dispersion of the coating material will be affected and the hardness of the coating will be decreased.

DETAILED DESCRIPTION OF THE PREFERRED EMBODIMENTS

A preferred embodiment of the present invention is described as follows: (The content is calculated by weight.)

It should be noted first that the following examples are not used to limit the basic components of the present invention. For example, the aromatic solvents can be benzene, toluene, xylene, chlorobenzene, phenol, methylphenol, etc., while the aliphatic solvents can be acetone, butanone, cyclopentanone, cyclohexanone, 2-methylpentanone-[4] or other higher ketone or dimethylformamide (DMF), tetrahydrofuran (THF), etc.

Example 1

Add 37.5 parts of toluene and 37.5 parts of butanone to 25 parts of vinyl chloride/vinyl acetate copolymer (serving as an adhesive) and stir and mix the same. After completely resolved, solution A is formed. Add 50 parts of butanone and 25 parts of cyclohexanone to 25 parts of polyurethane (serving as an adhesive) and stir and mix the same. After completely resolved, solution B is formed.

Take 30 parts of solution A, 36 parts of solution B and 19 parts of butanone and fully stir and mix the same. Thereafter, slowly add 10 parts of silica powder (the dimension of granule is within 0.01–4.0 u) and 5 parts of calcium carbonate (the dimension of granule is within 0.01–4.0 u) to the mixture. Stir the mixture homogeneously and disperse the same for two hours. The coarse powders provide good writability, while the fine powders provide good erasability. Both have the influence on the roughness and frictional coefficient of the surface of the paper. It is calculated that the coating materials contain 31.5% of solid component and the solid component contains 15% of inorganic pigments.

The coating materials are coated on the plastic film and then dried to form the tracing paper. The tracing paper is writable by ball-pen, pin-pen, pen and pencil. In case that the tracing paper is repeatedly written by a pencil and needs be repeatedly erased, the following examples will be more preferable.

Example 2

Take 31.3 parts of butanone, 6.9 parts of cyclohexanone and 20.7 parts of toluene and fully mix the same for 10 minutes. Then stir and add 11.8 parts of phenoxy resins (serving as an adhesive) and 19.2 parts of vinyl chloride/vinyl acetate copolymer. Stir, grind and resolve the same to form solution A. Take 15 parts of toluene, 37.5 parts of butanone and 17.5 parts of cyclohexanone and fully mix the same for 10 minutes. Thereafter, stir and add 30 parts of polyurethane and stir and grind the mixture for 4 hours to form solution B. The above percentage of each solvent is varied with the conditions of equipments and operations. It should not be ignored that the solvents having high boiling point, such as cyclohexanone, is not suitable to be excessively added. This is because in case such solvents fail to volatilize from the coating and remain therein, the coating will be powdery and the adhesion, duration and hardness of the coating will become poor. Nevertheless, it is not desired to totally avoid cyclohexanone and use butanone only. The volatilizing speed of the butanone is high and during drying stage, needle holes or swirl-like cells are liable to form on the surface of the coating.

Take 35 parts of solution A and add 6 parts of attapulgus clay (the dimension of granule is within 0.1–4.0 u) thereto. Stir the mixture homogeneously and disperse the same for 2 hours. Thereafter, add 52 parts of solution B to the mixture and stir and disperse the mixture homogeneously. Then slowly add 6 parks of silica powder (the same as ussed in Example 1) to be dispersed for 2 hours to form the main components of the coating material. Take 80–95 parts of main components of the coating material and 5–20 parts of hardening agents (containing isocyanate, 50% by weight of solid component). The percentage by weight of the above main components and hardening agents are determined by the hydroxy amount contained in the main components. Stir the mixture homogeneously for half an hour and then coat the mixture on the plastic film and then place the same into a drying oven area for drying to form the tracing paper. Other suitable inorganic pigments are calcium silicate, titanium dioxide, barium sulfate, magnessium carbonate, zinc oxide, etc. If it is desirable to disperse the coating materials more well or the inorganic pigments are not so easy to disperse, a surfactant such as amine surfactant can be added. It is not desirable to add excessive surfactant. Otherwise, the adhesion of the coating to the plastic film will be decreased. The amount of the added surfactant is determined by the ability of dispersion and the quality of the mixture. With respect to 0.1–10% of inorganic pigments, the dispersing time is limited to 2 hours. This time is determined by the equipments, procedures and materails. It is recommended that an optic microscope be used to observe the coating material until the granules daisperse homogeneously and no coarse particle exists. This means that the dispersion has been completed.

What is claimed is:

1. A method for manufacturing tracing paper, said method comprising coating a plastic film with a coating material comprising a solvent system, an adhesive combination, an inorganic pigment and optionally a surfactant:
   (a) wherein said solvent system contains 50–80% by weight of aliphatic solvents and 20–50% by weight of aromatic solvents;
   (b) wherein said adhesive combination contains polyurethanes, vinyl copolymers and phenoxy resins;
   (c) wherein said inorganic pigment contains at least two materials;
   (d) wherein said surfactant is an amine surfactant added to promote dispersion; and
   (e) wherein said coating material contains 20–60% by weight of solid components.

2. A method as claimed in claim 1, wherein said adhesive combination is in an amount of 40–70%, based on the weight of solid components.

3. A method as claimed in claim 1, wherein said adhesive combination includes 40–80% by weight of polyurethanes, 10–50% by weight of vinyl copolymers and 5–25% by weight of phenoxy resins.

4. A method as claimed in claim 1, wherein said inorganic pigment is in an amount of 30–60%, based on the weight of the solid components.

5. A method as claimed in claim 1, wherein said inorganic pigment contains at least two different materials with different granule diameters and roughness.

6. A method as claimed in claim 1, wherein said amine surfactant is in an amount of 0.1–10% based on the weight of said inorganic pigment.

7. The method according to claim 1, wherein said coating material consists essentially of
   (a) a solvent system containing 50–80% by weight of aliphatic solvents and 20–50% by weight of aromatic solvents, wherein said aliphatic solvent is selected from the group consisting of butanone, acetone, cyclopentanone, cyclohexanone, 2-methylpentanone-(4), dimethylformamide and tetrahydrofuran, and said aromatic solvent is selected from the group consisting of toluene, benzene, xylene, chorobenzene, phenol, and methylphenol;
   (b) an adhesive combination containing polyurethanes, vinyl copolymers and phenoxy resins, wherein said vinyl copolymer is a copolymer of vinyl chloride and vinyl acetate;
   (c) an inorganic pigment, wherein said inorganic pigment is at least two members selected from the group consisting of silica, calcium carbonate, attapulgus clay, calcium silicate, titanium dioxide, barium sulfate, magnesium carbonate, and zinc oxide; and
   (d) optionally an amine surfactant capable of promoting dispersion, wherein said coating material contains 20–60% by weight of solid components.

8. The method according to claim 1, wherein said vinyl copolymer is a copolymer of vinyl chloride and vinyl acetate.

9. The method according to claim 1, wherein said inorganic pigment is at least two members selected from the group consisting of silica, calcium carbonate, attapulgus clay, calcium silicate, titanium dioxide, barium sulfate, magnesium carbonate, and zinc oxide.

10. The method according to claim 1, wherein said aliphatic solvent is selected from the group consisting of butanone, acetone, cyclopentanone, cyclohexanone, 2-methylpentanone-(4), dimethylformamide and tetrahydrofuran, and said aromatic solvent is selected from the group consisting of toluene, benzene, xylene, chorobenzene, phenol, and methylphenol.

11. A coating material comprising:
(a) a solvent system containing 50–80% by weight of aliphatic solvents and 20–50% by weight of aromatic solvents;
(b) an adhesives combination, containing polyurethanes, vinyl copolymers and phenoxy resins;
(c) an inorganic pigment containing at least two materials; and
(d) optionally an amine surfactant capable of promoting dispersion,
wherein the material contains 20–60% by weight of solid components.

12. The coating material according to claim 11, wherein said adhesive combination includes 40–80% by weight of polyurethanes, 10–50% by weight of vinyl copolymers and 5–25% by weight of phenoxy resins.

13. The coating material according to claim 11, wherein said inorganic pigment is in an amount of 30–60% based on the weight of the solid components.

14. The coating material according to claim 11, wherein said inorganic pigments contains at least two different materials with different granule diameters and roughness.

15. The coating material according to claim 11, wherein said amine surfactant is in an amount of 0.1–10% based on the weight of said inorganic pigment.

16. The coating material according to claim 11, wherein said vinyl copolymer comprises vinyl chloride and vinyl acetate.

17. The coating material according to claim 11, wherein said inorganic pigment is at least two members selected from the group consisting of silica, calcium carbonate, attapulgus clay, calcium silicate, titanium dioxide, barium sulfate, magnesium carbonate, and zinc oxide.

18. The coating material according to claim 11, wherein said aliphatic solvent is selected from the group consisting of butanone, acetone, cyclopentanone, cyclohexanone, 2-methylpentanone-(4), dimethylformamide and tetrahydrofuran, and said aromatic solvent is selected from the group consisting of toluene, benzene, xylene, chorobenzene, phenol, and methylphenol.

19. The coating material according to claim 11, wherein said coating material consists essentially of
(a) a solvent system containing 50–80% by weight of aliphatic solvents and 20–50% by weight of aromatic solvents, wherein said aliphatic solvent is selected from the group consisting of butanone, acetone, cyclopentanone, cyclohexanone, 2-methylpentanone-(4), dimethylformamide and tetrahydrofuran, and said aromatic solvent is selected from the group consisting of toluene, benzene, xylene, chorobenzene, phenol, and methylphenol;
(b) an adhesive combination containing polyurethanes, vinyl copolymers and phenoxy resins, wherein said vinyl copolymer is a copolymer of vinyl chloride and vinyl acetate;
(c) an inorganic pigment, wherein said inorganic pigment is at least two members selected from the group consisting of silica, calcium carbonate, attapulgus clay, calcium silicate, titanium dioxide, barium sulfate, magnesium carbonate, and zinc oxide; and
(d) optionally an amine surfactant capable of promoting dispersion,
wherein said coating material contains 20–60% by weight of solid components.

20. The coating material according to claim 11, wherein said adhesive combination is in an amount of 40–70%, based on the weight of solid components.

* * * * *